(12) United States Patent
Gelb (10) Patent No.: US 9,017,462 B2
(45) Date of Patent: Apr. 28, 2015

(54) SELF ADJUSTING FILTER MASS AREA THAT PRODUCES EXTENDED FILTER LIFE AND UNIFORM STATIC PRESSURE THROUGHOUT

(76) Inventor: Joseph Gelb, Moreno Valley, CA (US)

(*) Notice: Subject to any disclaimer, the term of this patent is extended or adjusted under 35 U.S.C. 154(b) by 236 days.

(21) Appl. No.: 13/589,863

(22) Filed: Aug. 20, 2012

(65) Prior Publication Data

US 2013/0174742 A1      Jul. 11, 2013

Related U.S. Application Data (60) Provisional application No. 61/584,712, filed on Jan. 9, 2012.

(51) Int. Cl.
  *B01D 46/00* (2006.01)
  *B01D 46/52* (2006.01)
  *B01D 46/42* (2006.01)

(52) U.S. Cl.
  CPC .............. *B01D 46/521* (2013.01); *B01D 46/42* (2013.01); *B01D 2273/14* (2013.01); *B01D 2275/203* (2013.01)

(58) Field of Classification Search
  CPC .......... F24F 3/1603; F24F 13/28; A47L 5/12; B01D 46/26; B01D 46/42; B01D 33/04; B01D 33/06
  USPC ........... 96/423, 147, 152, 418; 55/385.3, 467, 55/475, 515
  See application file for complete search history.

(56) References Cited

U.S. PATENT DOCUMENTS

| | | | |
|---|---|---|---|
| 3,870,495 A * | 3/1975 | Dixson et al. | .................... 55/489 |
| 4,440,270 A | 4/1984 | Ross | |
| 4,456,099 A | 6/1984 | Kawaguchi | |
| 4,484,667 A | 11/1984 | Bottieri, Jr. | |
| 4,503,944 A | 3/1985 | Burckhardt | |
| 4,620,616 A | 11/1986 | Martin | |
| 4,772,299 A | 9/1988 | Bogusz | |
| 4,846,315 A | 7/1989 | Dayen | |
| 5,162,053 A | 11/1992 | Kowalski | |
| 5,284,227 A | 2/1994 | Pelfrey | |
| 5,758,687 A * | 6/1998 | Funicello | ...................... 137/615 |
| 5,772,286 A | 6/1998 | Jordan | |
| 5,878,848 A | 3/1999 | Zhang | |
| 5,968,217 A | 10/1999 | Stein | |
| 6,152,980 A | 11/2000 | Culwell | |
| 6,155,650 A | 12/2000 | Barger | |
| 6,173,821 B1 | 1/2001 | Herffurth | |

(Continued)

*Primary Examiner* — Robert Clemente
*Assistant Examiner* — Karla Hawkins
(74) *Attorney, Agent, or Firm* — Kirk A. Buhler; Buhler & Associates (57) ABSTRACT

Improvements in a filter where the filter self-expands based upon increased pressure or vacuum in the filtering stream. The expandable filter is adaptable to filtering a wide variety of media including air used in HVAC units, gases that are used to filter impurities out of gases and for industrial applications. The expandable filter to maintain a constant pressure or vacuum in the plenum or filter. The filter self-expands as the pressure or vacuum increases and pushes, pulls or draws the filter into an elongated or heightened configuration. As the filter expands new filter material is exposed that was not previously exposed for filtering. Expansion doubles, triples, or further increases the filter collection surface area. The filter does not rely upon gravity and expands based upon the increase of pressure or vacuum in the plenum the filter can be arranged in a vertical or horizontal orientation.

20 Claims, 8 Drawing Sheets

(56) References Cited

U.S. PATENT DOCUMENTS

| | | |
|---|---|---|
| 6,214,076 B1 | 4/2001 | Beier |
| 6,260,669 B1 | 7/2001 | Daudi |
| 6,315,091 B1 | 11/2001 | Nilsen |
| 6,371,569 B1 | 4/2002 | Dean |
| 6,419,056 B1 | 7/2002 | Dyko |
| 6,446,766 B1 | 9/2002 | Cornolti |
| 6,536,564 B1 | 3/2003 | Garfinkel |
| 6,578,678 B2 | 6/2003 | Lee |
| 6,579,337 B2 | 6/2003 | Heilmann |
| 6,592,642 B2 | 7/2003 | Maricq |
| 6,716,267 B2 | 4/2004 | Lawlor |
| 6,722,476 B1 | 4/2004 | Cornolti |
| 6,740,137 B2 | 5/2004 | Kubokawa |
| 6,796,405 B2 | 9/2004 | Ruiz |
| 6,857,510 B2 | 2/2005 | Schneider |
| 6,880,683 B1 | 4/2005 | Miles |
| 6,932,199 B2 | 8/2005 | Emmett |
| 6,962,242 B2 | 11/2005 | Conti |
| 7,037,354 B1 | 5/2006 | Dimicelli |
| 7,059,456 B2 | 6/2006 | Winklemann |
| 7,094,268 B2 * | 8/2006 | Krantz .................. 55/385.3 |
| 7,111,710 B2 | 9/2006 | O'Rourke |
| 7,963,376 B2 | 6/2011 | Gelb |
| 8,191,691 B2 | 6/2012 | Gelb |
| 2001/0032758 A1 | 10/2001 | Ruiz |
| 2001/0032759 A1 | 10/2001 | Deibel |
| 2002/0017435 A1 | 2/2002 | Feldmann |
| 2002/0023810 A1 | 2/2002 | Hasegawa |
| 2002/0038742 A1 | 4/2002 | Bunker |
| 2002/0084150 A1 | 7/2002 | Lee |
| 2002/0166740 A1 | 11/2002 | Zhang |
| 2003/0006107 A1 | 1/2003 | Tsai |
| 2003/0173166 A1 | 9/2003 | Garfinkel |
| 2003/0221918 A1 | 12/2003 | Lin |
| 2004/0089600 A1 * | 5/2004 | Haq et al. .................. 210/337 |
| 2004/0124046 A1 | 7/2004 | Hayes |
| 2004/0216968 A1 | 11/2004 | Donadoni |
| 2005/0056495 A1 | 3/2005 | Greppi |
| 2005/0126868 A1 | 6/2005 | Lee |
| 2005/0145452 A1 | 7/2005 | Yamamoto |
| 2005/0183909 A1 | 8/2005 | Rau |
| 2006/0049011 A1 | 3/2006 | Jacob |
| 2006/0086579 A1 | 4/2006 | Gerber |
| 2006/0151371 A1 * | 7/2006 | Weinberger et al. .......... 210/232 |
| 2006/0243547 A1 | 11/2006 | Keller |
| 2008/0257666 A1 | 10/2008 | Gelb |
| 2010/0096226 A1 * | 4/2010 | Gelb .................. 188/264 AA |
| 2011/0200494 A1 * | 8/2011 | Tanaka .................. 422/211 |

* cited by examiner

SELF ADJUSTING FILTER MASS AREA THAT PRODUCES EXTENDED FILTER LIFE AND UNIFORM STATIC PRESSURE THROUGHOUT

CROSS REFERENCE TO RELATED APPLICATIONS

This application claims the benefit of Provisional Application Ser. No. 61/584,712 filed Jan. 9, 2012 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a filter. More particularly, the present filter can automatically expands to provide new filter surface area to maintain uniform static pressure. The filter can be provided in square or round configurations.

2. Description of Related Art Including Information Disclosed Under 37 CFR 1.97 and 1.98.

Filters are used in a variety of places including but not limited to HVAC units, vacuums, automobiles and other places. For most or all of the filters used in these applications the installed filter has a fixed amount of filter surface area. As the filter gets clogged the efficiency of the apparatus has to work harder to pull air through the filter and will stop filtering completely if no warning is in place. A number of patents and or publications have been made to address filter applications. Exemplary examples of patents and or publication that try to address this/these problem(s) are identified and discussed below.

U.S. Pat. No. 6,740,137 that issued on May 25, 2004 to James O. Kubakawa et al discloses a Collapsible Pleated Filter Element. The pleated filter element collapses as the pleats fold upon each other. While the high and low peaks and valleys provide for additional surface area that is not present in a flat filter, once the filter is placed within the filter holder the surface area of the filter remains unchanged.

U.S. Pat. No. 5,968,217 issued on Oct. 19, 1999 to Myron Stein et al, and U.S. Pat. No. 7,037,354 that issued on May 2, 2006 to Anthony Dimicelli both disclose expandable air filter systems. The expandable air filter systems are essentially an expandable filter mounted within an expandable frame. These patents allow for a frame to be compressed and set within a forced air unit and then expanded accommodating the required filter size. This type of product is particularly useful when the actual dimensions are not known. While the filter may be expandable upon installation, once the filter is installed the filtering surface area remains unchanged as the filter collects debris.

U.S. Pat. No. 6,152,980 issued on Nov. 28, 2000 to C. William Culwell discloses a size adjustable filter element. A pleated filter element is slid into a "C" frame with multiple metal reinforcing members. Once the filter element is installed the pleated filter is expanded to fill a plenum cross section. While this filter is expandable, the filter surface area does not change or adjust as the filer becomes clogged thereby allowing the pressure or vacuum to change as the filter clogs.

The waste particles that are released into the atmosphere from brake pads also creates multiple dilemmas. As force is applied to brake pads, the material on the pads is ground away. This material is known as brake dust and can be problematic for two main reasons. The first is that brake dust is highly corrosive and harmful to the environment. It is estimated that up to ninety percent of the worn away brake pad particles are released into the atmosphere. The dust particles created, which contains copper, brass, Kevlar, carbon fibers, metal filings, asbestos to name a few and acidic adhesive material, is extremely caustic to the environment. The second problem is that the remainder of the brake dust particles that are not released into the atmosphere is deposited on the vehicle wheels. The brake dust particles can be corrosive enough to burn through wheel coatings and leave expensive wheels damaged and unsightly. As a result, there have been a number of devices that have introduced dust shields or filter systems designed to reduce brake dust. These include U.S. Pat. Nos. 7,094,268, 4,484,667, 6,371,569, 6,173,821, 6,932,199, 6,155,650 and 5,772,286. U.S. Pat. No. 5,162,053 discloses a system that utilizes a suction mechanism along with a filter to capture brake dust. Finally, U.S. Pat. No. 6,592,642 discloses a device that utilizes an electrostatic charge to collect charged brake dust particles.

What is needed is filter that self-adjust in size to provide new filter material as the pressure or vacuum in changes. The proposed application provides a solution with a filter that in initially installed in a collapsed configuration with a first surface area of filter material. As the first filter surface area becomes clogged, the change in pressure or vacuum causes the filter to expand and expose a larger surface area of filter material.

BRIEF SUMMARY OF THE INVENTION

It is an object of the expandable filter to fit within an existing filter housing or frame. For most installations the ability of the filter to operate within an existing plenum or flow opening is important to ensure easy translation from an existing fixed flow cross section filter to a self-expanding filter.

It is an object of the expandable filter to filter air, gases or liquids. The expandable filter is adaptable to filtering a wide variety of media including but not limited to air used in HVAC units, gases that are used to filter impurities out of gases used for industrial applications and liquids from light oils, water and heavy lubricants or media.

It is an object of the expandable filter to maintain a constant pressure or vacuum in the plenum or filter. In a number of installations a change in the pressure or vacuum changes the amount of power that is required to pump or move the air, gas or liquids through the filter. As a finite filter becomes clogged the amount of energy to pump through a clogging filter increases.

It is another object of the expandable filter to self-expand. The filter self-expands as the pressure or vacuum increases and pushes, pulls or draws the filter into an elongated or heightened configuration. As the filter expands new filter material is exposed that was not previously exposed for filtering. The expansion can double, triple, quadruple or further increase the filter collection surface area and is only limited by the area that available for expansion.

It is another object of the expandable filter to include a warning system that notifies a user that the filter has fully expanded and needs replacement or servicing. The warning system can be as simple as exposing a whistle opening, depressing or releasing a mechanical contact or switch. The warning system ensures that the pressure or vacuum within the plenum can be maintained before the filter becomes completely clogged.

It is another object of the expandable filter to collect brake dust from a vehicle. The braking system is at least partially enclosed with a plenum or shroud. A blower draws the brake dust from the plenum through the expandable filter for collection of the brake dust. The shroud has a pair of opposed side walls, a pair of opposed shroud end openings and a shroud interior. Typically, a shroud is disposed on both sides of the rotor such that the distal side peripheries are covered by the shrouds.

It is still another object of the expandable filter to operate in a horizontal or vertical arrangement. Because the filter does not rely upon gravity and expands based upon the increase of pressure or vacuum in the plenum the filter can be arranged in a vertical or horizontal orientation. As the filter expands, detents or steps hold the expandable filter sequentially in each step.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1A:
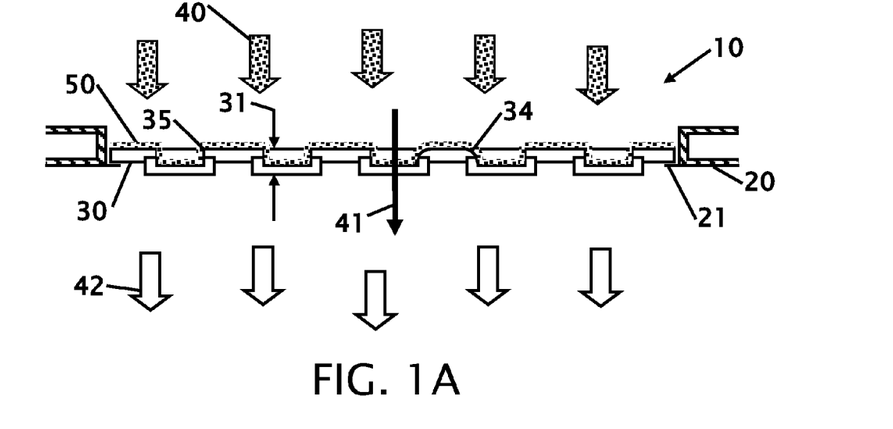
FIG. 1A shows the filter in an initial compressed mode.

FIG. 1A shows the filter in an initial compressed mode. In the compressed mode the filter 10 may have a similar appearance a non-expanding filter. The filter 10 is sized and shaped to fit into an existing mounting frame. In the embodiment shown the filter is installed in an air return for a house HVAC unit where walls or studs 20 support 21 the bottom 30 of the air filter 10. While this installation shows the filter 10 with the flow of air in a house, the flow can be gas, liquid or any other media that requires filtering. In addition to the media that is flowing, the installation is not limited to a house, and can be a vehicle air, oil, brake dust filter, gas filter or vehicle, home or industrial installation/application.

With a non-expandable filter, the surface area of the filter 20 is limited to the planar surface. Surface corrugations can add limited additional surface area, but the filter area remains fixed for the entire life of the filter. Basically unfiltered air 40 is drawn or pushed into the filter 10. The dirty air 40 is collected 50 in the filter so clean air 42 exits the filter. As the filter 10 collects dirt 50 the amount of force to pass the air 40 through the filter increases. This increase requires the bower motor or pump to work harder. It is also contemplated that the edges of the filter can be square 35 or rounded 34 to improve air flow on and around the filter edges. As the pressure or vacuum of the air or media passing through the filter 10 increase the self-expanding filter opens from an initial dimension 31 in FIG. 1 to an extended dimension 32 as shown in FIG. 1B.

Figure 1B:
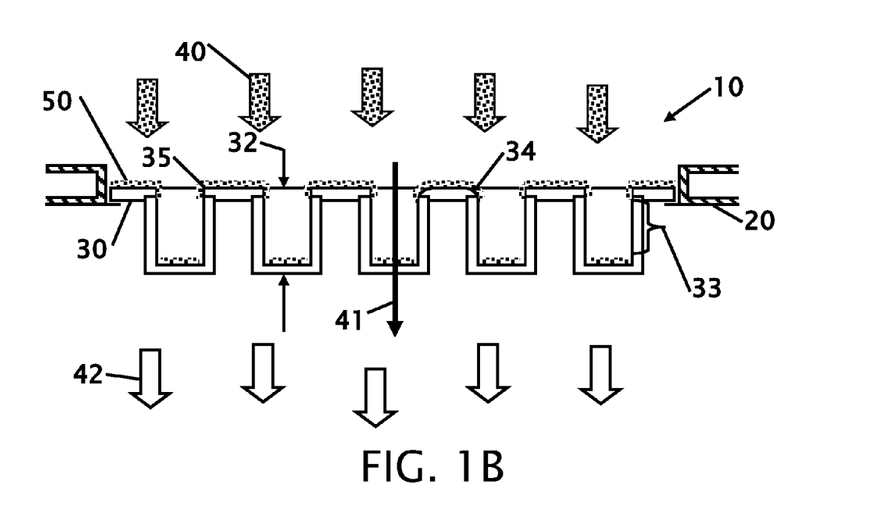
FIG. 1B shows the filter in an expanded mode.

FIG. 1B shows the filter in an expanded mode. When the filter 10 expands the height or depth 32 of the filter increases 33 to provide vertical walls 33 of expanded surface area for filtering. In many installations a pump or blower operates at optimal efficiency where there is an ideal static back pressure. Operating the pump or blower above or below the optimal back pressure can cause inefficiencies in the power consumption and or flow rate through the pump, blower, plenum or filter. In a non-expanding filter the back pressure can vary significantly from when the filter is clean to when the filter is dirty. In the self-expanding air filter, one or more sections of the air filter can expand 41 or open to maintain a more constant pressure or vacuum within flow stream to allow the pump or blower to operate at the optimum efficiency level. The expansion or opening provides new and unused filter area to be exposed thereby increasing the total filter/collection surface area.

Figure 2A:
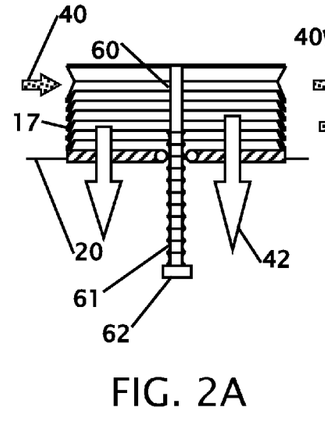
FIG. 2A shows a self-adjusting filter in a new compressed mode.
Figures 2B, 2C:
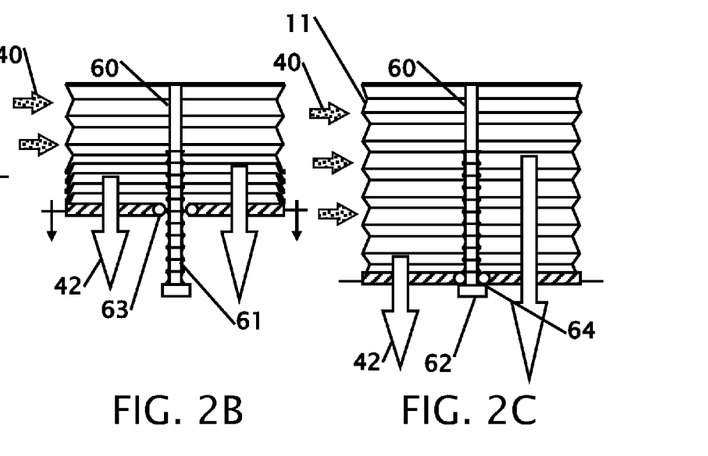
FIG. 2B shows a self-adjusting filter in a semi-expanded mode.
FIG. 2C shows a self-adjusting filter in an expanded mode.

FIG. 2A shows a self-adjusting filter in a new compressed mode, FIG. 2B shows a self-adjusting filter in a semi-expanded mode, and FIG. 2C shows a self-adjusting filter in an expanded mode. From these figures the filter 11 is pleated or otherwise folded within a supporting cage that is supported 20. In FIG. 2A the pleats 17 and mostly folded upon each other. Dirty air 40 enters into the exposed pleats and clean air 42 exits out of the filter. A central shaft 60 with detents 61 supports the collapsed filter. As the exposed filter material in FIG. 2A gets clogged the increased back pressure caused the filter to progressively open into FIG. 2B.

A spring loaded ball 63 or other limiting mechanism rides in the detents 61 and limits the filter from completely opening in a single event. From FIG. 2B two pleats are opened to allow dirty air 40 to flow through the two open pleats. In this example at least six independent pleats 17 and or detents 61 are shown. While six sets are shown and described in this example, as few as two too many more than six pleats 17 or detents 61 are contemplated. In FIG. 2C the pressure or vacuum has completely opened the filter thereby exposing all of the pleats 11. A stopping head 62 prevents further expansion of the filter and a mechanical switch 64 or whistle that notifies the consumer or user to replace the self-adjusting filter.

Figure 3:
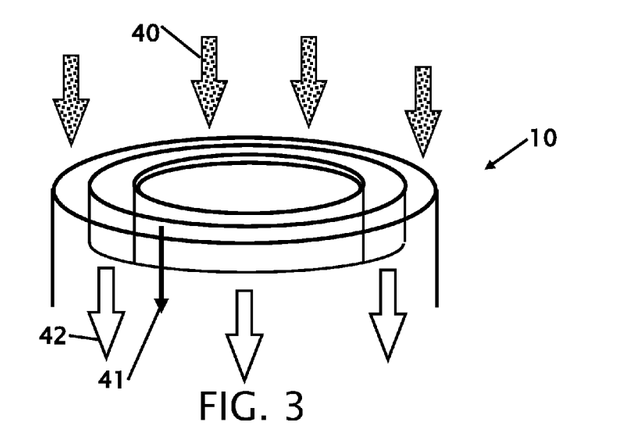
FIG. 3 is a detailed view of an expanding chamber in a vertical orientation.

FIG. 3 is a detailed view of an expanding chamber in a vertical orientation. The filter 10 relies upon the pressure or vacuum of the system to open or expand the filter. Because the system pressure or vacuum is used the filter can be oriented in nearly any direction or orientation. The detents and spring loaded balls from the previous figures prevent the effects of gravity from overcoming the weight of the filter and close the filter with pressure or vacuum is not present. From the vertically oriented filter in FIG. 3, dirty air 40 enters into the filter 10 and clean air 42 exits the self-expanding filter. As the filter gets clogged the filter 10 can expand 41 to expose unused filter surface area.

Figure 4:
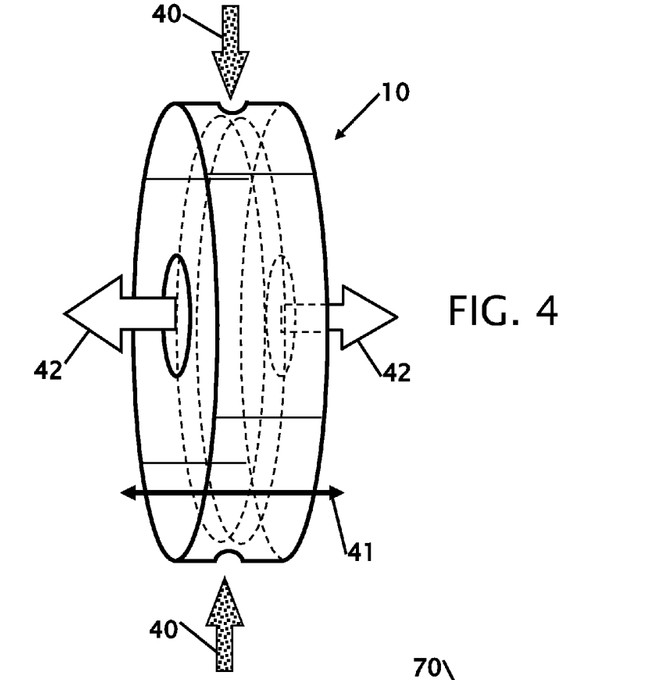
FIG. 4 shows a detail view of an expanding filter where the filter expands horizontally in both directions.

FIG. 4 shows a detail view of an expanding filter 10 where the filter expands horizontally 41 in both directions. In this embodiment, air enters 40 into the outer radius of the filter. It is contemplated that within the filter, a dirt debris or particle generating mechanism or device may exist. One type of device can be a braking mechanism that generates brake dust that must be filtered to allow clean air 42 to exit. As the filter collects brake dust the filter can open 41 in one or both directions to expose additional collection media or filter. One such collection media or filter is shown and described with FIG. 5.

Figure 5:
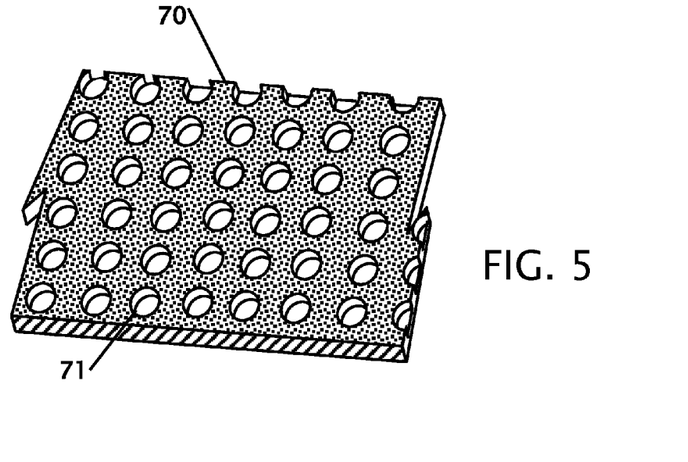
FIG. 5 shows a section of Type 2 Fixed filter material.

FIG. 5 shows a section of Type 2 fixed filter material 70. The filter or media collection material in this example is 316 stainless steel with 150 micron 71 collection filter 70 but other equivalent or superior materials are contemplated. This size of filter porosity is ideal for collection of brake pad dust. This filter size allows for collections of the brake pad while allows for air to pass through the filter 70.

Figure 6:
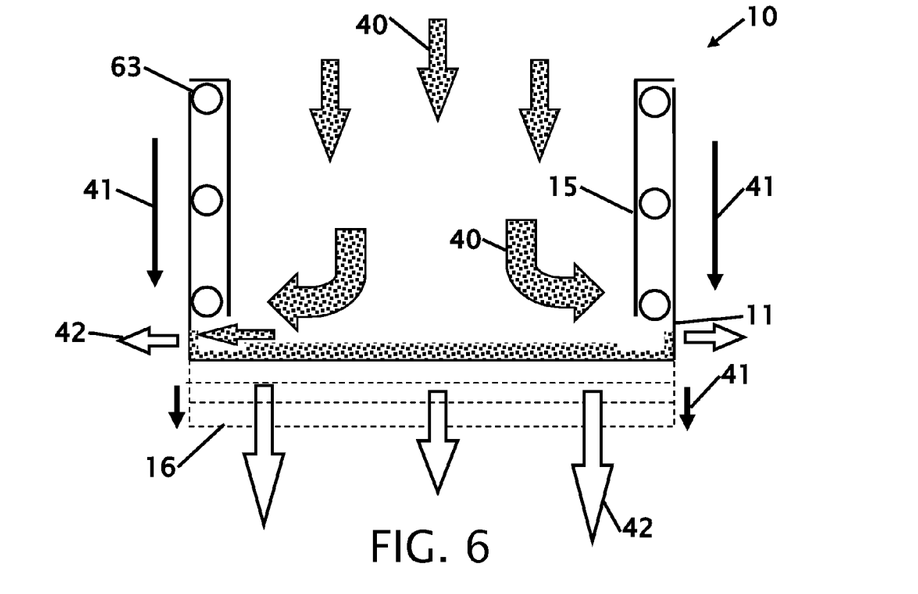
FIG. 6 shows a vertically expandable filter.

FIG. 6 shows a vertically expandable filter. This embodiment shows a filter 10 with a vertical shield 15 that allows flow only through the exposed filter surface 11. Dirty air 40 enters into the filter 10 and filtered air 42 exits the filter 10. As the exposed filter area becomes clogged the filter 10 moves 41 to expose unused filter material. Bearings, balls or detents 63 provide steps to open 41 the filter in finite or infinite intervals 16 to expose unused filter surface.

Figure 7:
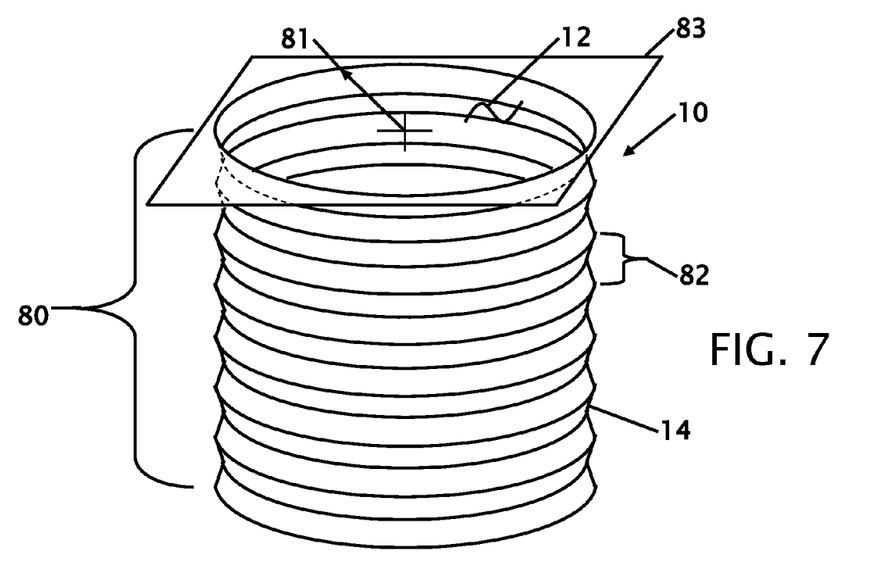
FIG. 7 shows the mathematical relationship of the surface area of a self-expanding filter.

FIG. 7 shows the mathematical relationship of the surface area of a self-expanding filter 10. This embodiment provides some simple calculation examples to indicate the initial, steps and final amount of filtering. When this filter 10 is completely closed only the top surface 12 is used for filtering. A flange 83 prevents air from passing around the filter. If the top has a radius 81 of 5 inches then the top filter area is about 78 square inches. A single step 82 of one and a quarter inch will add over 39 square inches of filter surface area or about 50% more collection area. In the embodiment shown, seven expandable pleats are shown. These seven pleats 14 provide a total 80 of over 274 square inches of collection area for a total of 354 square inches while maintaining a fairly constant pressure or vacuum in the stream flow. This is 4.5 times greater area of collection. It is contemplated that any dimensions and pleat/detents can be changed to increase or decrease these ratios.

Figure 8:
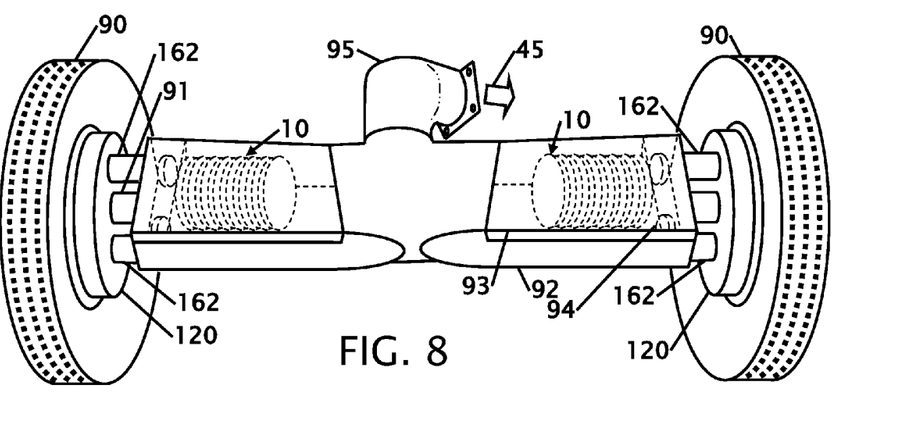
FIG. 8 shows a perspective view of axle of a vehicle with the expanding filter collecting brake debris.
Figure 9:
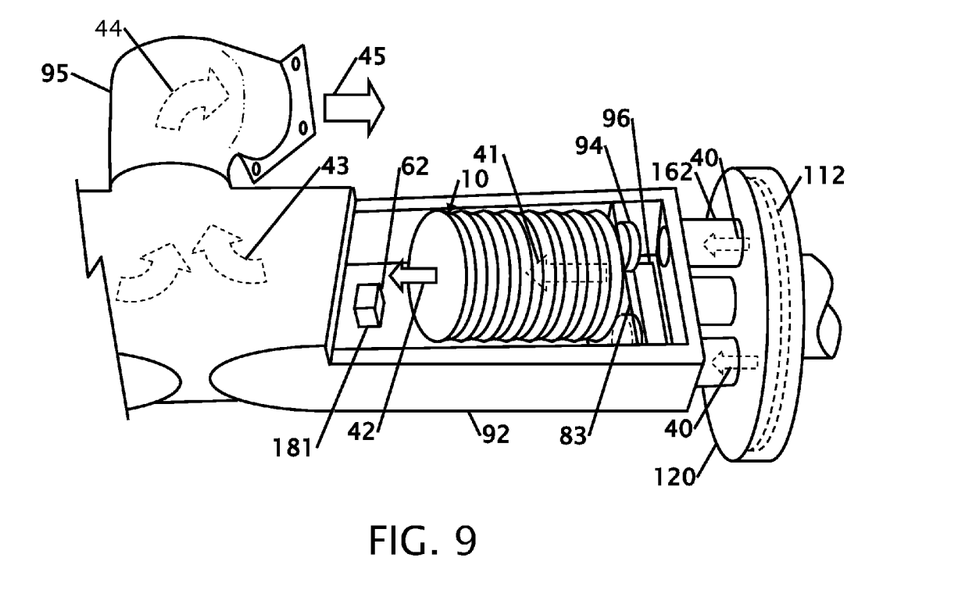
FIG. 9 shows a detailed perspective view of one side of a vehicle showing the internal feature of collecting brake debris.

FIG. 8 shows a perspective view of axle of a vehicle with the expanding filter collecting brake debris and FIG. 9 shows a detailed perspective view of one side of a vehicle showing the internal feature of collecting brake debris. From FIG. 8 the tire(s) 90 of the vehicle are shown. While this embodiment shows a single blower with two expandable filters 10, each rotor 112 of a vehicle can have its own expandable filter and blower 95 or a single expandable filter 10 and a single blower 9 can collect braking debris from more than two rotors 112. From FIG. 9 the rotor is predominantly surrounded by a shroud 120. The rotor and shroud assembly is shown and described in more detail in FIGS. 10, 11 and in the inventor's U.S. Pat. Nos. 7,963,376 and 8,191,691. Ducts 162 connect from the shroud 120 to the duct housing 92. This embodiment shows the axle 91 extending under or around the duct housing 92. In the preferred embodiment the blower 95 is operated when the brake switch is activated. While this is the preferred embodiment the blower can operate at all times or can operate at different speeds depending upon the braking condition of the vehicle.

Air 40 with brake debris moves from the shroud 120 through duct(s) 162. In the embodiment shows an optional removable pre-filter tray 96 is shown that separates large debris such as rocks and other objects that initially enter the plenum 92 and collide with the pre-filter elements 94 from fine brake debris. A flange 83 prevents air from passing around the filter. As brake debris fills the expandable filter 10 the filter expands 41 to provide unused filter surface area as previously shown and described to provide a nearly constant vacuum or back-pressure within the collection plenum 92. As the filter 10 becomes full and completely expands a stopping head 62 with a sensing switch 181 provides notification that the expandable filter 10 must be serviced. A removable cover 93 provides access to the expandable filter 10 and or the pre-filter tray 96.

Filtered air 42 exits the expandable filter 10 and is drawn 43 through the ducting 92 by the blower 92 where the clean air 44 is blown into the atmosphere 45 or to another location.

Figures 10, 11:
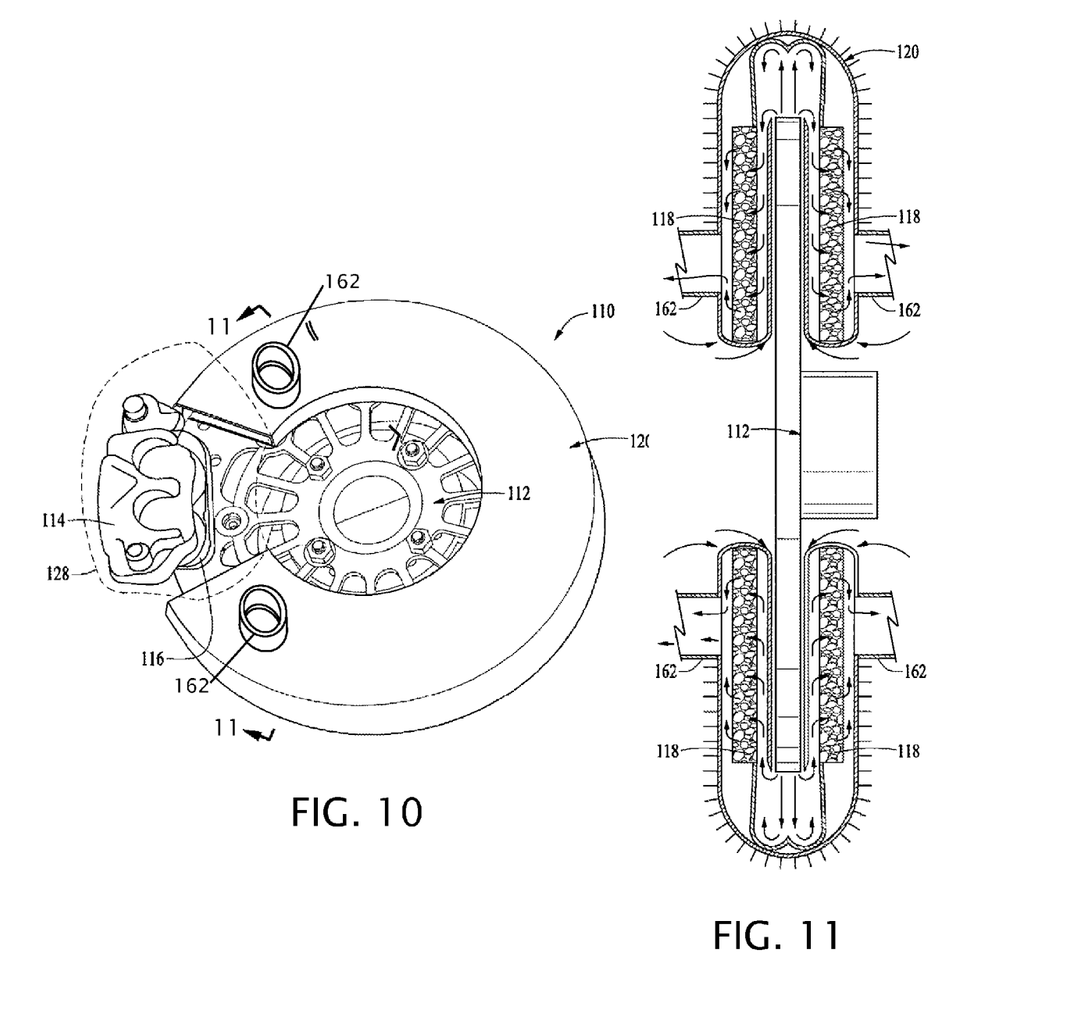
FIG. 10 shows an embodiment of a brake debris collecting shroud on a disc brake rotor from FIGS. 8 and 9.
FIG. 11 shows a cross-section of the embodiment from FIG. 10.

FIG. 10 shows an embodiment of a brake debris collecting shroud on a disc brake 114 rotor and brake pad 116 or shoe from FIGS. 8 and 9. FIG. 11 shows a cross-section of the embodiment from FIG. 10. These figures illustrate an embodiment wherein one of the shroud side walls 122 defines a pair of shroud wall openings. Disposed in fluid communication with each shroud wall opening is a duct 162 adapted to direct airflow out of the shroud interior and towards the brake pad or shoes. In this embodiment, a single shroud 120 not only covers at least one of the distal side peripheries of the rotor 112, but also covers the available exposed distal edge periphery of the rotor 112. In this design, the rotation of the rotor 112 also acts as an impeller to drive air through the shroud interior and ducts 162. A filter 118 or pre filter may be placed within the shroud 120.

Figure 12:
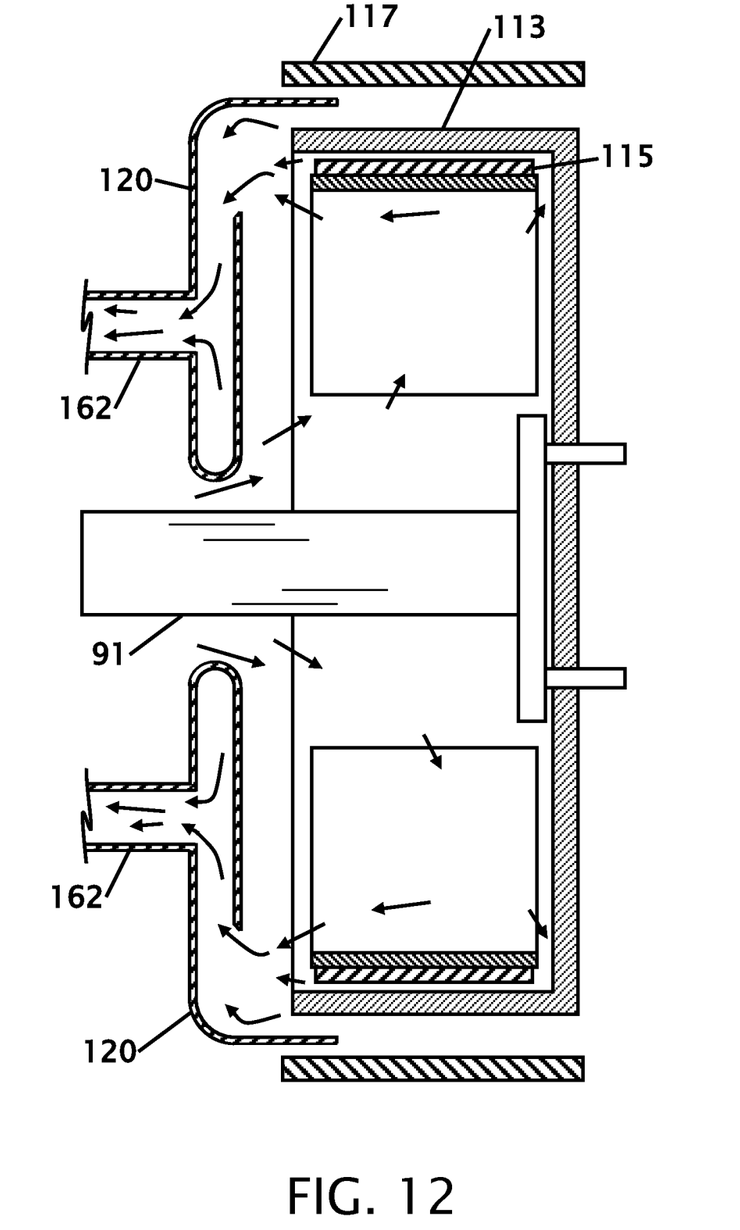
FIG. 12 show a cross section of the brake dust collection shroud on a drum brake.

FIG. 12 show a cross section of the brake dust collection shroud on a drum brake mounted within a tire rim 117. Brake drum systems are commonly used in the rear axles 91 of trucks. These trucks can have multiple axles 91 with each axle having a drum on each tire. In this figure the axle 91 mounted on a drum 113 with the brake pad(s) 115 exerting braking forces on the interior of the brake drum 113. Air is moved or drawn through the drum 113, around the brake pad(s) or shoe(s) 115 and brake shoes or pads where the air moves brake dust through the shroud 120 and into the duct 162 for collection.

Figure 13:
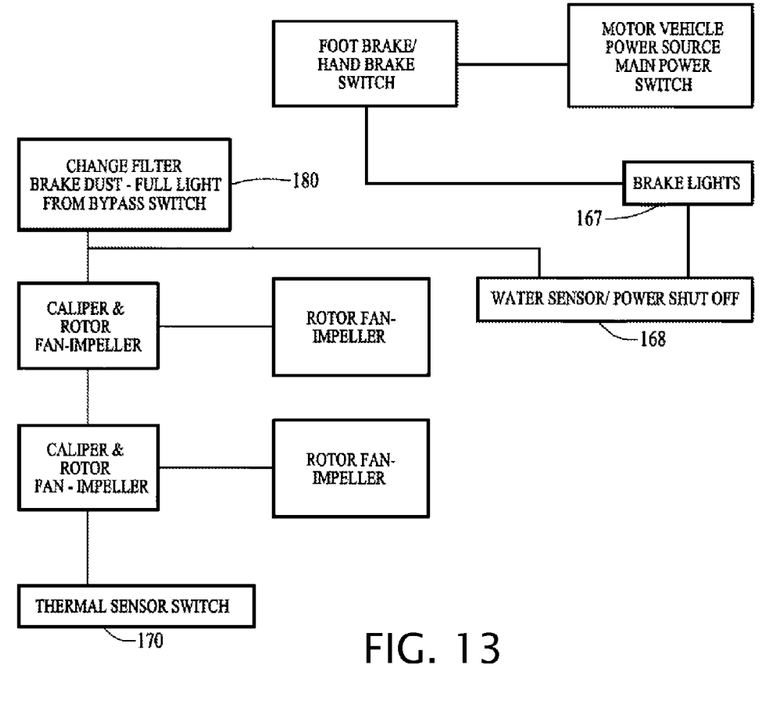
FIG. 13 show a control diagram illustrating features of the invention.

FIG. 13 illustrates a control scheme which can be used in the operation of the invention. In one aspect of this control scheme, when the braking action of the disc brake assembly 110 is initiated, electrical power flowing to the vehicle's brake lights 167 also provides power to blowers or fans 95 as shown and described in FIG. 8.

Also as indicated in FIG. 13, a water sensor 168 can be used to automatically shut off power to the blower or fan 95 when moisture is detected within the housing 128 and or 120, and to indicate same to the motor vehicle operator. Once moisture is no longer detected within the housing 128 and or 120, the blower or fan 95 are again allowed to turn on when braking action is initiated. Such water sensor 168 protects the blowers or fans 95 in the event of inadvertent total submersion. A sensor switch 180 indicates that the filter is full and requires cleaning or replacement.

Also as indicated in FIG. 13, a thermal sensor switch 170 can be used to detect excess heat within the housing 120 above a predetermined set temperature. The thermal sensor switch 170 can be adapted to automatically activate the brake pad fans or blower 95 to cool the disk brake assembly 110 even without having to initiate braking action. Once the temperature in the housing 120 falls below the set temperature, the brake pad fans or blower 95 are caused to stop and return to normal operation.

While the filters are shown and described in a variety of shapes and orientation, it is contemplated that the filter can be made in shapes from triangular, rectangular, square, octagonal, round and any variation that can be contemplated.

Thus, specific embodiments of an expandable filter have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An expandable filter comprising:
   a filter that is placeable within a gas, air or fluid flow stream;
   said filter having a first exposed filtering surface area upon installation and initial use;
   said filter increases in filtering surface area from said first exposed filtering surface area as said first exposed filtering surface area becomes clogged whereby increasing said exposed filtering surface area exposing at least a second exposed filtering surface area that was not exposed upon initial use thereby providing a larger exposed surface area of said filter material as need to stabilize a pressure differential through said filter.

2. The expandable filter according to claim 1 wherein said filter has multiple pleats whereby each pleat provides additional exposed filtering surface area to increase said exposed filtering surface.

3. The expandable filter according to claim 1 wherein said filter is configured with round or square expanding sections.

4. The expandable filter according to claim 1 wherein said filter expands by creating a telescoping height or depth to expose said at least a second exposed surface area.

5. The expandable filter according to claim 1 wherein said increase in filtering surface area maintains an essentially uniform static pressure.

6. The expandable filter according to claim 1 wherein said filter has a fixed first end and is free floating from a second distal end and changes said filter surface area that increases only from pressure vacuum.

7. The expandable filter according to claim 1 that further includes a vacuum that draws said gas, air or fluid flow stream through said expandable filter.

8. The expandable filter according to claim 1 that further includes a blower that pushes said gas, air or fluid flow stream through said expandable filter.

9. The expandable filter according to claim 1 that further includes a sensing means to identify or indicate when said expandable filter has expanded from said first exposed filtering surface area to said at least a second exposed filtering surface area.

10. The expandable filter according to claim 1 that further includes a pre-filter.

11. The expandable filter according to claim 1 wherein said expandable filter is serviceable and or replaceable.

12. The expandable filter according to claim 1 that is integrated with a brake dust collection system.

13. The expandable filter according to claim 12 wherein said brake dust collection system is configured to operate with a vehicle.

14. The expandable filter according to claim 12 wherein movement of said vehicle moves at least some air and brake dust into said expandable filter.

15. The expandable filter according to claim 12 that further includes an electric blower or vacuum system that is at least partially controlled by a braking system of a vehicle.

16. The expandable filter according to claim 12 collects brake debris from at least one brake rotor, one brake caliper, one brake disk, or one brake shoe, or one brake pad, or one brake drum.

17. The expandable filter according to claim 12 that collects brake dust from more than one brake rotor, one brake caliper, one brake disk, or one brake shoe, or one brake pad, or one brake drum.

18. The expandable filter according to claim 12 wherein said brake dust collection system is configurable in a vertical or horizontal mounting to a vehicle body.

19. The expandable filter according to claim 16 wherein said brake dust collection system further includes a shroud that predominantly surrounds said at least one brake rotor, one caliper, one brake pad, one brake shoe, one disk and one brake drum.

20. The expandable filter according to claim 18 wherein said shroud further includes at least one pair of lips or edges located in proximity to the outer radius of said brake rotor or brake drum.

\* \* \* \* \*